(12) United States Patent
Knopp et al.

(10) Patent No.: US 7,784,772 B2
(45) Date of Patent: Aug. 31, 2010

(54) SPRING SYSTEM

(75) Inventors: Axel Knopp, Eitelborn (DE);
 Karl-Heinz Darscheid, Hillscheid (DE);
 Stefan Bonnekessel, Koblenz (DE);
 Rainer Massmann, Bonn (DE); Rolf Mintgen, Thuer (DE); Torsten Rickenberg, Neuwied (DE);
 Jörg-Erwin Scheuer, Karlsruhe (DE);
 Dirk Schweinberger, Karlsruhe (DE);
 Daniel Herbst, Karlsruhe (DE);
 Joachim Völlinger, Grossenlüder (DE)

(73) Assignee: Stabilus GmbH, Koblenz (DE)

( * ) Notice: Subject to any disclaimer, the term of this patent is extended or adjusted under 35 U.S.C. 154(b) by 664 days.

(21) Appl. No.: 11/528,142

(22) Filed: Sep. 27, 2006

(65) Prior Publication Data
 US 2007/0187194 A1 Aug. 16, 2007

(30) Foreign Application Priority Data
 Sep. 27, 2005 (DE) ................ 10 2005 046 268

(51) Int. Cl.
 *F16F 9/00* (2006.01)
 *F16F 1/12* (2006.01)
(52) U.S. Cl. .............. 267/74; 267/175; 267/177; 267/179
(58) Field of Classification Search ............ 267/73, 267/74, 166, 169, 170, 174, 175, 177, 178, 267/179; 16/51, 66, 84, 85, 72
 See application file for complete search history.

(56) References Cited
 U.S. PATENT DOCUMENTS

| | | | | |
|---|---|---|---|---|
| 923,953 A * | 6/1909 | Davis | .......... | 267/74 |
| 2,407,958 A * | 9/1946 | Kearney | .......... | 267/73 |
| 2,604,657 A * | 7/1952 | Tipper | .......... | 267/73 |
| 2,743,475 A * | 5/1956 | MacNerland | .......... | 267/177 |
| 3,741,558 A * | 6/1973 | Ochs | .......... | 267/73 |
| 3,795,390 A | 3/1974 | Kendall et al. | | |
| 4,765,444 A * | 8/1988 | Bauer et al. | .......... | 188/322.22 |
| 4,834,347 A * | 5/1989 | Pauliukonis | .......... | 188/322.22 |
| 4,968,010 A | 11/1990 | Odobasic | | |

(Continued)

FOREIGN PATENT DOCUMENTS

DE     101 47 229     4/2003

(Continued)

OTHER PUBLICATIONS

Chinese Office Action dated Feb. 1, 2008 issued in corresponding application No. 200610127089.3.

*Primary Examiner*—Thomas J Williams
(74) *Attorney, Agent, or Firm*—Cohen Pontani Lieberman & Pavane LLP (57) ABSTRACT

A spring system has a first pulling part with a first fastening element connected by a tension spring to a second pulling part with a second fastening element. The pulling parts are moveable relative to one another so as to increase or relieve stressing on the tension spring. A damping device damps the movement of the pulling parts in relation to one another. A cylinder is fastened on the first pulling part and a piston 3 is axially displacesably arranged therein, subdividing the interior of the cylinder into a first cylinder chamber and a second cylinder chamber. A piston rod connected to the piston is arranged on the second pulling part. The interior of the cylinder is connected to the surroundings via one or more restrictor openings.

26 Claims, 4 Drawing Sheets

U.S. PATENT DOCUMENTS

| | | | | |
|---|---|---|---|---|
| 4,977,631 A * | 12/1990 | Bretz | ......................... | 267/74 |
| 6,942,204 B2 * | 9/2005 | Wolf et al. | ................. | 267/221 |
| 7,025,343 B2 * | 4/2006 | Chou | ....................... | 267/177 |
| 2004/0104522 A1 | 6/2004 | Wolf et al. | | |
| 2004/0211631 A1 * | 10/2004 | Hsu | ......................... | 188/286 |

FOREIGN PATENT DOCUMENTS

| | | |
|---|---|---|
| DE | 102 36 137 | 2/2004 |
| GB | 05059 | 12/1914 |
| JP | 60-049145 | 3/1985 |

* cited by examiner

SPRING SYSTEM

BACKGROUND OF THE INVENTION

1. Field of the Invention

The invention relates to a spring system having a first pulling part having a first fastening element, a second pulling part having a second fastening element, a tension spring connecting the first pulling part to the second pulling part, the pulling parts being movable relative to one another along a movement path so as to subject the tension spring to stressing or relieve the same of stressing, and a damping device for damping the movement of the pulling parts in relation to one another over at least a part of the movement path.

2. Description of the Related Art

A prior art spring system is known which includes a damping device which has, on a second pulling part, a cone tapering in the direction of a first pulling part and has, on the first pulling part, a corresponding cone mount, into which it is possible to insert the cone at the end of the movement of the pulling parts in relation to one another. There is frictional contact here between the cone and cone mount, as a result of which the movement of the pulling parts in relation to one another is damped.

However, this known damping device provides only insufficient damping.

SUMMARY OF THE INVENTION

An object of the invention is to provide a spring system having straightforward construction and ensuring good temperature-independent damping of the movement of the pulling parts in relation to one another in particular in the final part of their movement in relation to one another.

The object is achieved according to the invention in that fastened on the first pulling part is a cylinder which is directed towards the second pulling part and in which a piston is arranged in a displaceable manner, the piston subdividing the interior of the cylinder into a first cylinder chamber, which is closer to the first pulling part, and a second cylinder chamber, which is closer to the second pulling part, and having a piston rod which is arranged on the second pulling part, the interior of the cylinder being connected to the surroundings via one or more restrictor openings.

This spring system is constructed using straightforward components and is of small overall size and has a damping device which operates in accordance with the principles of an air pump. It is an open and thus temperature-independent system and, in the rest state, has atmospheric pressure in its interior.

When the second pulling part is displaced in the direction of the first pulling part, the air which is located in the first cylinder chamber is compressed. This pressure dissipates via the restrictor openings which are coordinated in terms of cross section such that the movement of the pulling parts in relation to one another is damped and does not take place abruptly. This also avoids a rebound action, which would result in a non-uniform movement sequence.

Such a spring system preferably serves for opening a shutter or flap of a motor vehicle, one pulling part being articulated on the bodywork of the motor vehicle and the other pulling part being articulated on the shutter or flap.

The second cylinder chamber is preferably permanently connected to the surroundings, this rendering the construction and installation of the spring system particularly straightforward.

The restrictor opening in the piston may, for example, be designed to connect the first cylinder chamber to the second cylinder chamber.

This results in approximately uniform damping over the entire path over which the pulling parts move in relation to one another.

The same function is also achieved if an annular gap is present between the radially encircling lateral surface of the piston and the inner wall of the cylinder, this annular gap forming the restrictor opening.

It is also possible, however, for the restrictor opening to project through the base of the cylinder, this base being directed away from the second pulling part. Alternatively, the restrictor opening or the restrictor openings can project radially through the cylinder wall of the cylinder.

If a plurality of restrictor openings are formed at uniform or non-uniform spacings from one another along the longitudinal extent of the cylinder, it is possible to attain speed control. The damping at any one time is determined in accordance with the overall cross section of the restrictor openings which then connect the first cylinder chamber to the surroundings, this overall cross section being dependent on the position of the piston in the cylinder.

In order to achieve an intensifying damping action only in the end region of the movement of the pulling parts in relation to one another, the restrictor openings may be formed in that end region of the cylinder which is closer to the first pulling part.

When used on a shutter or flap in a motor vehicle, it is thus possible for the shutter or flap to open quickly at the start and for the end of the opening movement to take place in a damped manner. A rebound action is avoided by the speed being reduced at the end of the opening movement. At the end of the displacement, the nozzle cross section is reduced so as to ensure a soft end stop.

A further possible way of forming the restrictor opening is for the restrictor opening to be a restrictor groove which is formed on the inner wall of the cylinder and extends along the longitudinal extent of the cylinder. Since the restrictor groove is also repeatedly exposed when the piston is displaced, it cannot become clogged up by dirt.

The damping action is constant over the entire displacement here if the restrictor groove has an identical cross section over its entire length.

If the restrictor groove has different cross sections along its length, it is thus possible to effect speed control via the displacement.

The tension spring may, for example, be a helical tension spring.

If the helical tension spring here encloses the cylinder with radial play, this results in a compact construction which requires only a small amount of installation space.

In order to achieve a less damped movement of the pulling parts away from one another, the piston may have a non-return valve via which the second cylinder chamber can be connected to the first cylinder chamber.

The non-return valve may, for example, be implemented by forming on the piston a radially encircling annular groove in which a sealing ring with an axial extent which is smaller than the axial extent of the annular groove is arranged in a displaceable manner, the sealing ring having its outer lateral surface butting against the inner wall of the cylinder and being spaced apart from the base of the annular groove, it being the case that connecting openings lead to the first cylinder chamber from a region which forms part of the annular-groove side wall closer to the first pulling part and which cannot be covered by the sealing ring.

If the axial length of the piston corresponds at least largely to the axial length of the cylinder, then the piston is provided with good guidance over its movement path in the cylinder.

Sufficient guidance may also be achieved if the piston rod has a just slightly smaller diameter than the piston. In this case, the piston rod preferably has one or more longitudinal grooves for air-discharging purposes.

A cost-effective construction is achieved if the first pulling part and the cylinder and/or the second pulling part and the piston rod and/or the piston are formed in one piece, it being possible for the first pulling part and the cylinder and/or the second pulling part and the piston rod and/or the piston to be plastic parts, in particular plastic injection mouldings.

Both straightforward installation capability and a straightforward construction are achieved if at least one of the first pulling part and the second pulling part has a cylindrical lateral surface which is provided with an external thread onto which it is possible to screw one end of the helical tension spring with its coils.

This further results in the tension spring being subjected to a lower level of stressing in its fastening region on the pulling part.

If, furthermore, one free end of the helical tension spring and/or the other are/is formed into a hook which projects axially beyond the first and/or the second pulling part and forms the first and/or the second fastening element, then the helical tension spring performs a double function.

The spring system may have an arrangement for adjusting the prestressing of the tension spring. One possibility in this respect is for the second pulling part to be adjustable axially in relation to the piston or in relation to the piston rod.

The adjustment of the spring prestressing may be effected in a stepless manner, along with a straightforward construction, by forming the second pulling part as a nut which is screwed onto a sleeve provided with an external thread, the sleeve being supported axially on the piston by way of its end which is directed towards the first pulling part, and the sleeve preferably being arranged such that it can be guided in an axially displaceable manner on the piston rod.

Another way of adjusting the prestressing of the tension spring is to arrest the second pulling part in steps, or in a stepless manner, in a number of axial positions on the piston rod.

For this purpose, a stepless adjustment can take place in that the second pulling part is a nut which is screwed onto the piston rod provided with an external thread.

It is possible, however, for the second pulling part to have a fastening pin which bears the second fastening element at one end and projects into a coaxial recess of the piston rod, in which it can be arrested in a number of axial positions by one or more arresting elements, for which purpose preferably the piston rod has a transverse recess into which it is possible to insert a catch which projects in a form-fitting manner into one of a number of corresponding arresting recesses of the fastening pin, these recesses being spaced apart axially from one another on the fastening pin.

A precise adjustment is possible here if the fastening pin is provided, on one side or two sides, with rows of teeth, and the gaps between the teeth of the rows of teeth form the arresting recesses.

A further adjustment of the prestressing of the tension spring is possible in that the tension spring can be fastened in a number of axial positions on the first pulling part and/or on the second pulling part or on the piston rod.

It is possible here for that end of the tension spring which is directed towards the first pulling part and/or which is directed towards the second pulling part to be designed as a hook and to be capable of being hooked into one of a number of recesses arranged axially one behind the other.

The prestressing can be adjusted particularly straightforwardly here if there is formed in the first pulling part and/or the second pulling part or in the piston rod a coaxial adjusting slot from which limited-length arresting slots extend at axial spacings from one another, the arresting slots being formed radially or in an inclined manner in relation to the tension spring.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are described in more detail hereinbelow and illustrated in the drawing, in which.

DETAILED DESCRIPTION OF THE PRESENTLY PREFERRED EMBODIMENTS

The spring systems which are illustrated in the FIGS. 1-7 have a first pulling part 1, on which a cylinder 2 is arranged in an integral manner. A piston 3 is arranged in an axially displaceable manner in the cylinder 2 and subdivides the interior of the cylinder into a first cylinder chamber 4 and a second cylinder chamber 5. A piston rod 6 is arranged in an integral manner on the piston 3 and is guided outwards through the second cylinder chamber 5.

Figure 1:
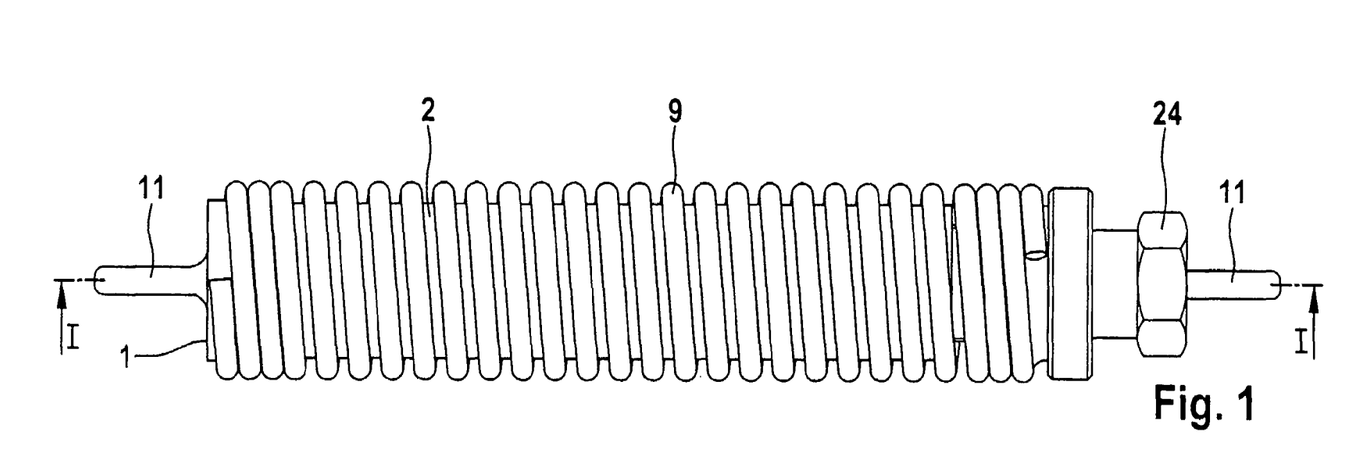
FIG. 1 is a side view of a first embodiment of a spring system according to the present invention.
Figure 2:
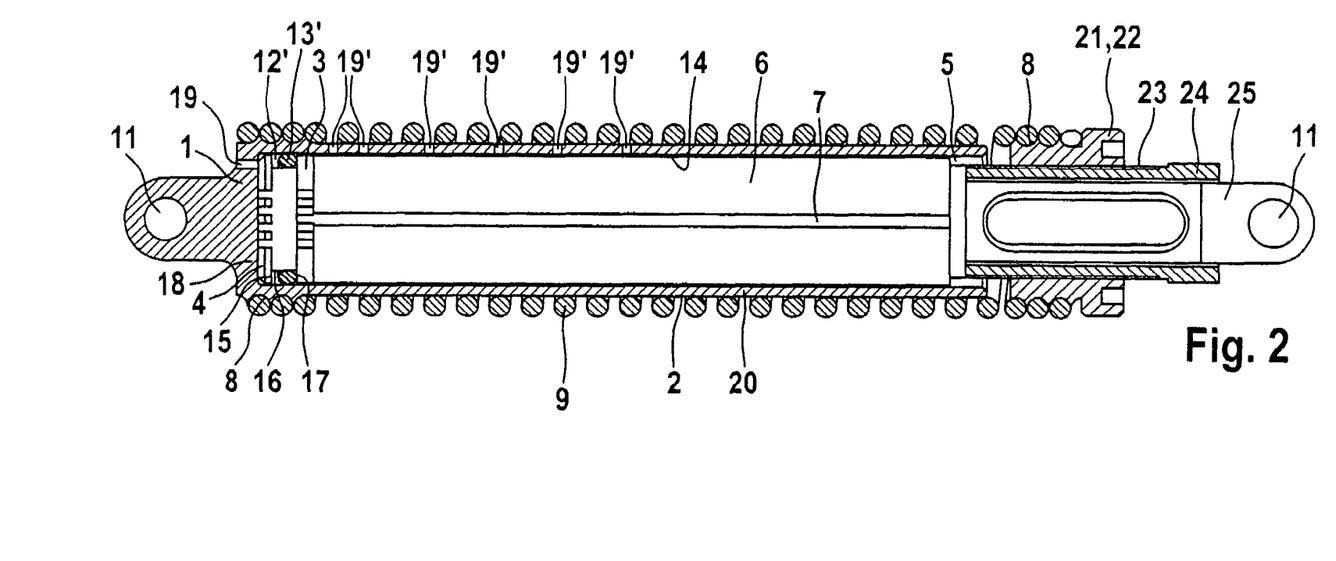
FIG. 2 is a longitudinal sectional view of the spring system of FIG. 1 along line II-II in FIG. 1.

In the embodiment of FIGS. 1 and 2, the piston rod 6 has an external diameter which is just slightly smaller than the internal diameter of the cylinder 2. The outer lateral surface of the piston rod 6, which is illustrated in FIG. 2, also having formed on it an axial groove 7, which extends over the entire length of the piston rod.

In FIGS. 1-7, the second cylinder chamber 5 opens out in the outward direction. The first pulling part has a cylindrical lateral surface which is provided with an external thread 8 onto which is screwed one end of a helical compression spring 9 with its coils.

Figure 3:
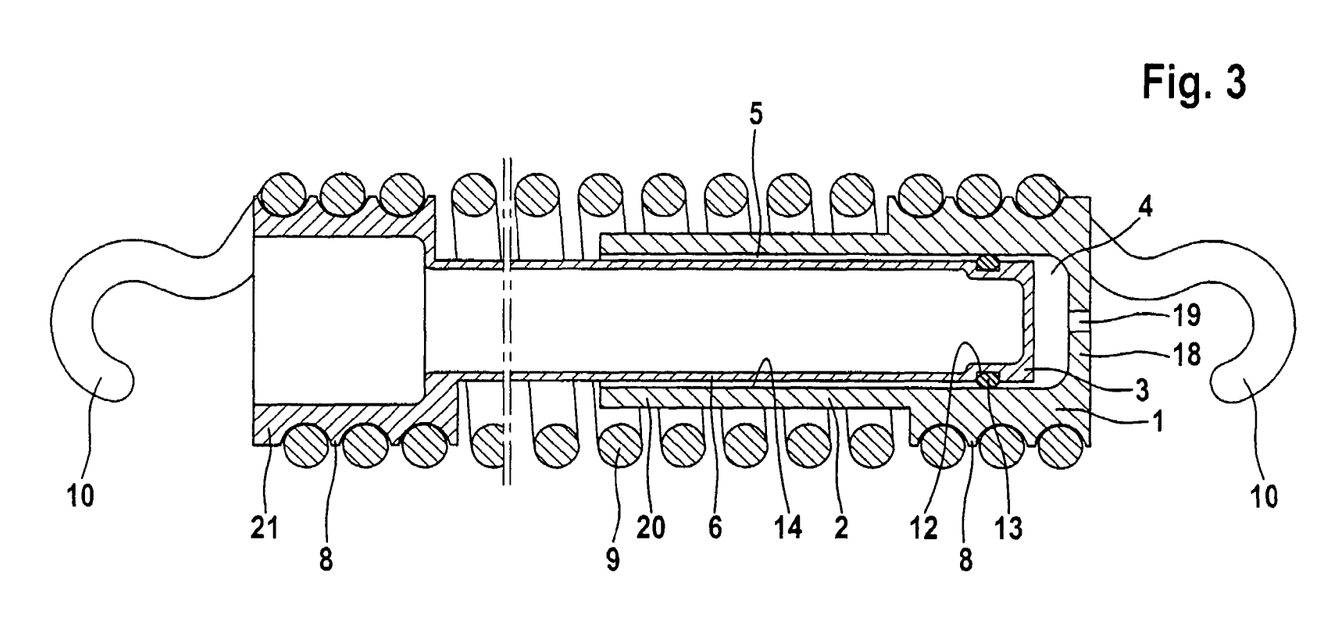
FIG. 3 is a longitudinal sectional view of a second embodiment of a spring system according to the present invention.

In the particular embodiment of FIG. 3, the free end of the helical compression spring 9 is guided around the first pulling part 1 and formed into a hook 10 which, on the side which is opposite to the cylinder 2, projects axially away from the first pulling part 1 and forms a fastening element.

In the embodiment of FIGS. 1 and 2, a corresponding fastening element, designed as an eyelet 11, is formed integrally with the first pulling part 1.

In FIG. 3, the piston 3 has a radially encircling annular groove 12 into which is inserted a sealing ring 13, which butts against the inner wall 14 of the cylinder 2 and separates the first cylinder chamber 4 from the second cylinder chamber 5 during both retraction and extension of the piston 3.

In FIGS. 1 and 2, the piston 3 likewise has formed on it a radially encircling annular groove 12' into which is inserted a sealing ring 13', the axial extent of the latter being smaller than the axial extent of the annular groove 12' and the sealing ring 13' being axially displaceable in the annular groove.

The sealing ring 13' butts against the inner wall 14 of the cylinder 2 by way of its outer lateral surface, but can have flow passing beneath it on the side of the base of the annular groove 12'.

Connecting openings designed as connecting grooves 16 are arranged in the side wall 15, which is closer to the second pulling part 1, whereas the other side wall 17 of the annular groove 12 has no such connecting openings.

This design forms a non-return valve which is closed when the piston is pushed into the cylinder 2 and is open when it is moved out. In the open position, air can flow into the second cylinder chamber 5 from the first cylinder chamber 4 via the annular groove 12'.

On the side of the first pulling part 1, the cylinder 2 is closed by a base 18 in which is formed an axial restrictor opening 19 which connects the first cylinder chamber 4 to the surroundings.

In FIGS. 1 and 2, further restrictor openings 19' are formed radially in the cylinder wall 20 of the cylinder 2 at irregular spacings from one another along the longitudinal extent of the cylinder 2.

When the piston 3 is pushed in, the air which is present in the first cylinder chamber 4 is displaced outwards via the restrictor openings 19 and 19', so that this movement takes place in a damped manner.

The helical tension spring 9 encloses the cylinder 2 with radial play and is connected to a second pulling part 21 at its end which is opposite to the first pulling part 1.

In FIG. 3, the second pulling part 21 is fixed at that end of the piston rod 6 which projects out of the cylinder 2, and, like the first pulling part 1, its radially encircling lateral surface has an external thread 8 onto which the end of the helical tension spring 9 is screwed.

Furthermore, the free end is designed as a hook 10, in accordance with the design on the side of the first pulling part 1.

In the case of the exemplary embodiments of FIGS. 1 and 2 and also 4 and 5, the second pulling part 21 is a nut 22 which, corresponding to the second pulling part 21 in FIG. 3, is provided with an external thread 8 onto which the end of the helical tension spring 9 is screwed. It is not the case, however, that a hook is formed by the free end of the helical tension spring 9. The nut 22 is screwed onto a sleeve 24 which is provided with a corresponding external thread 23 and is supported axially on the piston 3 by way of its end which is directed towards the first pulling part 1. The prestressing of the helical tension spring 9 can be adjusted by virtue of the sleeve 24 being rotated relative to the nut 22.

Figure 4:
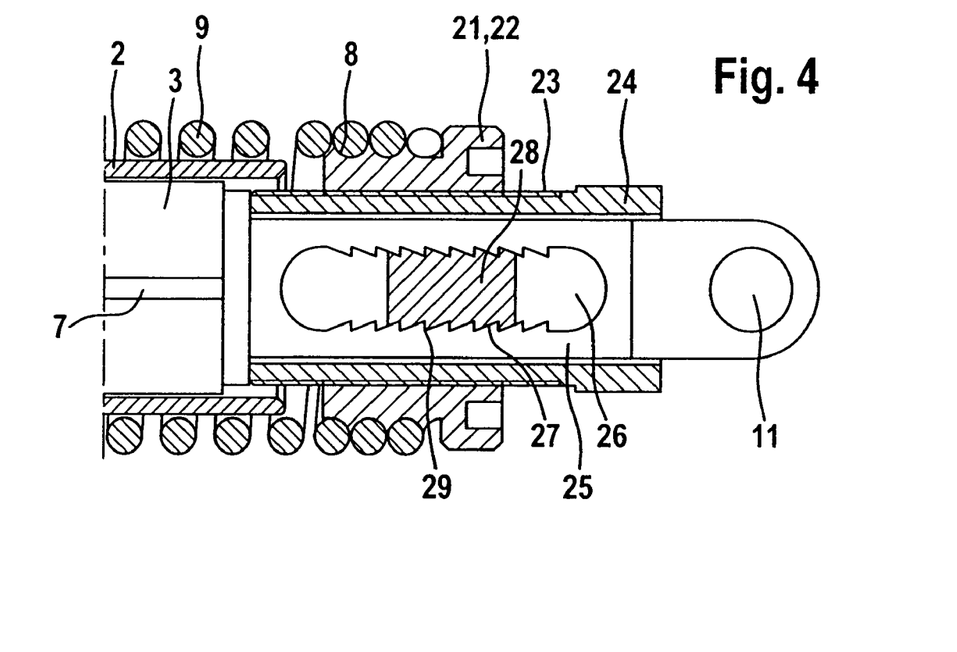
FIG. 4 is a sectional view of a spring system in the region of the second pulling part according to another embodiment of the present invention.

In FIG. 4, an extension 25, which is fixed to the piston rod 6 and has an eyelet 11 serving as a fastening element at its free end, projects through the axial bore of the sleeve 24. An axially extending transverse recess 26 which is designed as a slot and has a sawtooth profile 29 on its longitudinal sides is formed in the sleeve 24. A corresponding transverse recess 27 with a smaller axial extent than the transverse recess 26 is formed in the extension 25. A catch 28 with the cross section of the transverse recess 27 projects through both transverse recesses 26 and 27.

Figure 5:
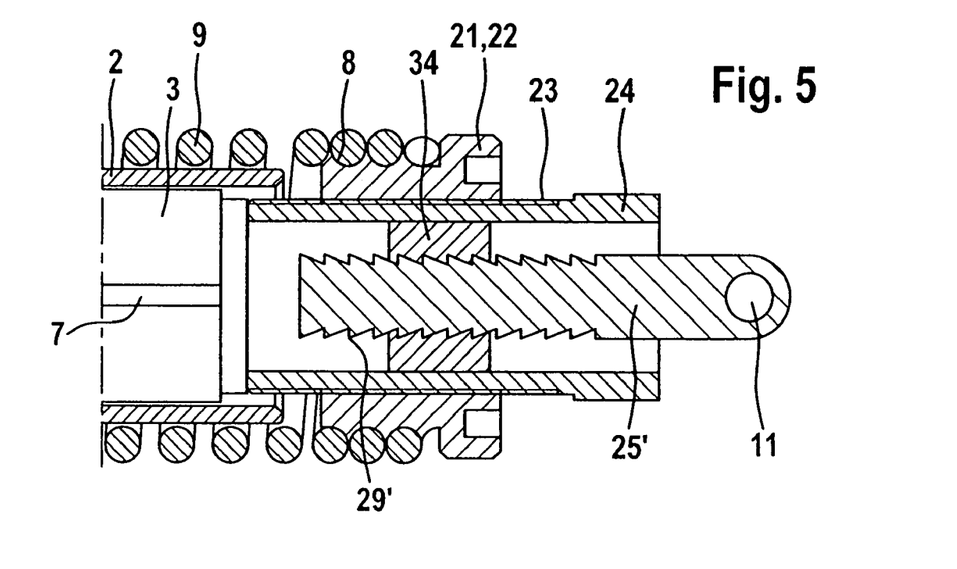
FIG. 5 is a sectional view of a spring system in the region of the second pulling part according to yet another embodiment of the present invention.

FIG. 5 likewise has a fastening pin 25' with an eyelet 11, although this fastening pin is not fixed to the piston 3. The fastening pin 25' is provided with a sawtooth profile 29' on its mutually opposite longitudinal sides and is fixed by a securing part 34 which engages in a form-fitting manner in the sawtooth profile and, in turn, is fixed to the sleeve 24.

Figure 6:
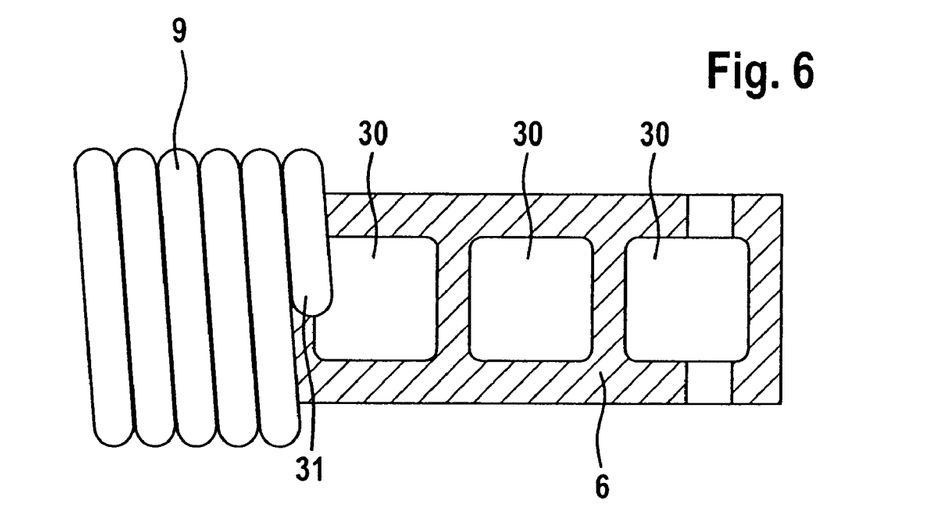
FIG. 6 is a sectional view of a spring system in the region of the second pulling part according to a further embodiment of the present invention.
Figure 7:
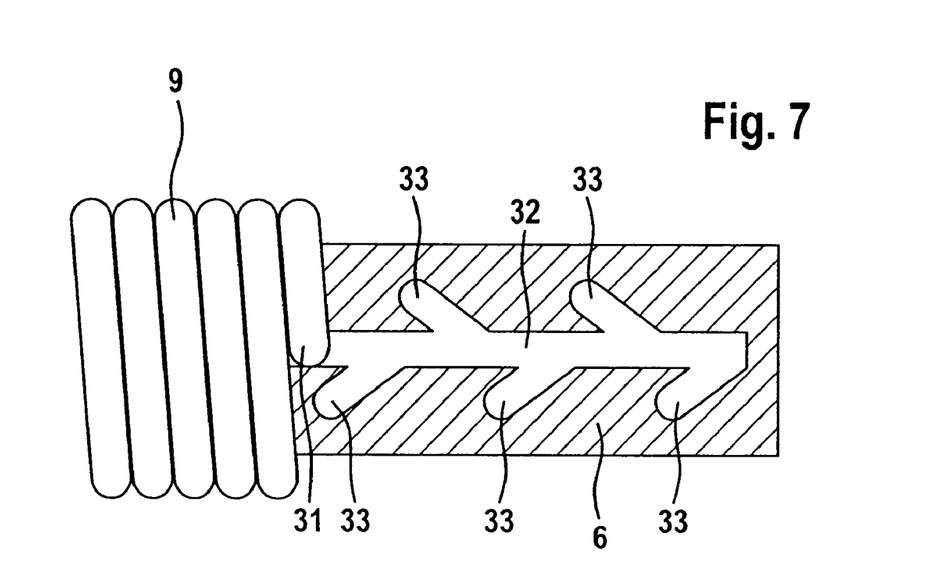
FIG. 7 is a sectional view of a spring system in the region of the second pulling part according to yet another embodiment of the present invention.

In FIGS. 6 and 7, the free end of the piston rod 6 simultaneously forms the second part 21. This free end of the piston rod 6 in FIG. 6 contains a number of recesses 30 which are arranged axially one behind the other and into which that end of the helical tension spring 9 which is bent over to form a hook 31 can be hooked. The prestressing of the helical tension spring 9 is determined in accordance with the recess 30 selected for insertion of the hook 31.

The free end of the piston rod 6 in FIG. 7 contains a coaxial adjusting slot 32 from which arresting slots 33 extend laterally at axial spacings from one another. The arresting slots 33 are of only limited length and are inclined in the direction away from the free end of the piston rod 6. Here too, the end of the helical tension spring 9 is bent over to form a hook 31 and engages in an arresting slot 33 in order to determine the prestressing of the helical tension spring 9, in which case it butts against the closed end of the arresting slot. In order to change the prestressing, all that is required is for the hook 31 to be displaced in the arresting slot 33 as far as the adjusting slot 32 and, in the latter, to the new arresting slot 33 desired and introduced into the latter.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A spring system, comprising:
    a first pulling part having a first fastening element;
    a second pulling part having a second fastening element;
    a tension spring connected to each of said first and second pulling parts so that said first pulling part is connected to said second pulling part by said tension spring, said first and second pulling parts being movable along a movement path relative to one another to increase or release a stress on the tension spring; and
    a damping device for damping the relative movement between said first and second pulling parts, said damping device including:

a cylinder connected to said first pulling part, extending toward said second pulling part, the cylinder having an open end; and a piston displaceably arranged in said cylinder and dividing an interior of said cylinder into first and second cylinder chambers, said first cylinder chamber being closer to said first pulling part, said piston having a piston rod arranged on said second pulling part, wherein said interior of said cylinder is connected to ambient surroundings through at least one restrictor opening defined in said cylinder such that pressure generated in said interior during relative movement of said first and second pulling parts is dissipated through said at least one restrictor opening, wherein an outside diameter of the piston rod is substantially the same as the inside diameter of the cylinder such that a piston rod guide is not required at the open end of the cylinder, wherein a relative axial position between said second pulling part and one of said piston and piston rod is adjustable, wherein said second pulling part is arrestable at a plurality of axial positions on said piston rod, and wherein said second pulling part includes a fastening pin which bears said second fastening element, said fastening pin projects into a coaxial recess of said piston rod, and at least one arresting element for arresting said fastening pin at said plurality of axial positions relative to said piston rod.

2. The spring system of claim 1, wherein said second cylinder chamber is permanently connected to the ambient surroundings by said at least one restrictor opening.

3. The spring system of claim 2, wherein a further restrictor opening defined in said piston connects said first cylinder chamber to said second cylinder chamber.

4. The spring system of claim 1, wherein said at least one restrictor opening projects through a base of said cylinder, said base being arranged on a side of said cylinder facing away from said second pulling part.

5. The spring system of claim 1, wherein said at least one restrictor opening projects radially through a cylinder wall of said cylinder.

6. The spring system of claim 5, wherein said at least one restrictor opening comprises a plurality of restrictor openings formed at uniform or non-uniform spacings from one another along the longitudinal extent of said cylinder.

7. The spring system of claim 5, wherein said at least one restrictor opening comprises a plurality of restrictor openings formed in an end region of said cylinder proximate said first pulling part.

8. The spring system of claim 1, wherein said at least one restrictor opening includes a restrictor groove formed on an inner wall of said cylinder and extending along the longitudinal extent of said cylinder.

9. The spring system of claim 8, wherein said restrictor groove has an identical cross section over the entire length of said restrictor groove.

10. The spring system of claim 8, wherein said restrictor groove has a cross section that changes along the length of said restrictor groove.

11. The spring system of claim 1, wherein said tension spring is a helical tension spring.

12. The spring system of claim 11, wherein said helical tension spring encloses said cylinder with radial play.

13. The spring system of claim 1, wherein said piston includes a non-return valve, wherein said second cylinder chamber is connectable to said first cylinder chamber through said non-return valve.

14. The spring system of claim 13, wherein said piston has an annular groove defined in an outer circumferential surface of said piston having axial side walls and a base, said spring system further comprising a sealing ring arranged in said annular groove, said sealing ring having an axial extent smaller than an axial length of said annular groove such that said sealing ring is at least axially displaceable within said annular groove, said sealing ring having an outer lateral surface abutting an inner wall of said cylinder and being spaced apart from said base of said annular groove, said piston further defining connecting openings extending between said first cylinder chamber and the one of said axial sides walls of said annular groove that is closer to said first pulling part, said connecting openings being arranged so that said sealing ring is prevented from blocking said connecting openings.

15. The spring system of claim 1, wherein an axial length of said piston corresponds at least largely to an axial length of said cylinder.

16. The spring system of claim 1, wherein one of a first combination of said first pulling part and said cylinder and a second combination of said second pulling part and said piston rod are formed as a single piece.

17. The spring system of claim 16, wherein said single piece comprises a plastic injection molding.

18. The spring system of claim 11, wherein at least one of said first pulling part and said second pulling part includes a cylindrical lateral surface defining an external thread for engagedly receiving one end of said helical tension spring.

19. The spring system of claim 18, wherein at least one free end of said helical tension spring is formed into a hook which projects axially beyond a corresponding one of said first and second pulling parts, said hook forming the associated one of said first and second fastening element.

20. The spring system of claim 1, further comprising a sleeve having an external thread, an end of said sleeve facing said first pulling part being supported axially on said piston, said second pulling part comprising a nut threadably received onto said sleeve.

21. The spring system of claim 20, wherein said sleeve is arranged on said piston rod so that it is axially displaceably guided by said piston rod.

22. The spring system of claim 1, wherein said piston rod has an external thread and said second pulling part comprises a nut threaded onto said external thread of said piston rod.

23. The spring system of claim 1, wherein said fastening pin comprises a plurality of axially spaced arresting recesses and said piston rod has a transverse recess, said spring system further comprising a catch insertable into said transverse recess for engaging one of said arresting recesses of said fastening pin.

24. The spring system of claim 23, wherein at least one side of said fastening pin comprises a row of teeth, gaps between said teeth forming said arresting recesses.

25. A spring system, comprising:
a first pulling part having a first fastening element;
a second pulling part having a second fastening element;
a tension spring connected to each of said first and second pulling parts so that said first pulling part is connected to said second pulling part by said tension spring, said first and second pulling parts being movable along a movement path relative to one another to increase or release a stress on the tension spring; and a damping device for damping the relative movement between said first and second pulling parts, said damping device including:

a cylinder connected to said first pulling part, extending toward said second pulling part, the cylinder having an open end; and a piston displaceably arranged in said cylinder and dividing an interior of said cylinder into first and second cylinder chambers, said first cylinder chamber being closer to said first pulling part, said piston having a piston rod arranged on said second pulling part, wherein said interior of said cylinder is connected to ambient surroundings through at least one restrictor opening defined in said cylinder such that pressure generated in said interior during relative movement of said first and second pulling parts is dissipated through said at least one restrictor opening, wherein an outside diameter of the piston rod is substantially the same as the inside diameter of the cylinder such that a piston rod guide is not required at the open end of the cylinder, wherein said tension spring is fastenable at a plurality of axial positions on one of said first pulling part, said second pulling part or said piston rod, and wherein one of said first pulling part, second pulling part, and said piston rod comprises a plurality of recesses arranged in axial succession, an end of said tension spring directed towards one of said first pulling part and said second pulling part defines a hook engageable in one of said plurality of recesses.

26. The spring system of claim 25, wherein said one of said first pulling part, said second pulling part, and said piston rod defines a coaxial adjusting slot joining a plurality of limited-length arresting slots which extend at axial spacings from one another, the arresting slots being formed radially or in an inclined direction relative to a longitudinal axis of said tension spring.

* * * * *